(12) United States Patent
Peterman

(10) Patent No.: US 6,428,876 B1
(45) Date of Patent: Aug. 6, 2002

(54) LAMINATED SIDING PIECES AND METHOD OF PRODUCING THE SAME

(75) Inventor: Robert J. Peterman, Eugene, OR (US)

(73) Assignee: Joined Products, Inc., Eugene, OR (US)

(*) Notice: Subject to any disclaimer, the term of this patent is extended or adjusted under 35 U.S.C. 154(b) by 85 days.

(21) Appl. No.: 09/641,613

(22) Filed: Aug. 17, 2000

Related U.S. Application Data

(63) Continuation-in-part of application No. PCT/US99/07556, filed on Apr. 6, 1999.

(51) Int. Cl.⁷ ................................................. B32B 3/26
(52) U.S. Cl. ........................... 428/172; 428/60; 428/61; 428/156; 428/161; 52/560
(58) Field of Search ............................. 428/60, 61, 156, 428/161, 172; 52/560, 518

(56) References Cited

U.S. PATENT DOCUMENTS

| | | |
|---|---|---|
| 1,108,884 A | 9/1914 | Bird |
| 1,184,509 A | 5/1916 | Bird |
| 1,481,670 A | 1/1924 | MacAllister et al. |
| 1,950,032 A | 3/1934 | Kirschbraun |
| 2,158,908 A | 5/1939 | Ottinger |
| 2,198,245 A | 4/1940 | Gross et al. |
| 2,232,075 A | 2/1941 | Nevin |
| 2,241,642 A | 5/1941 | McCauley |
| 2,706,164 A | 4/1955 | Hervey |
| 3,003,205 A | * 10/1961 | Frashour et al. ............... 52/560 |
| 3,041,231 A | 6/1962 | Fountain |
| 3,345,244 A | 10/1967 | Stolesen et al. |
| 3,865,680 A | 2/1975 | Reese et al. |
| 3,865,681 A | 2/1975 | Beebe |
| 4,292,780 A | 10/1981 | Barker et al. |
| 4,388,133 A | 6/1983 | Hirao el al. |
| 4,402,169 A | 9/1983 | Martin et al. |
| 5,074,092 A | 12/1991 | Norlander |
| 5,248,541 A | 9/1993 | Tilby |
| 5,636,490 A | 6/1997 | Stocksieker |
| 6,042,680 A | 3/2000 | Peterman |

* cited by examiner

Primary Examiner—Alexander S. Thomas
(74) Attorney, Agent, or Firm—Law firm of: Timothy E. Siegel

(57) ABSTRACT

Laminated siding pieces and a method of producing them. A laminated siding work piece is provided including a substantially flat piece of display material having a first major surface that is laminated to a beveled piece of support material. The substantially flat piece of display material is cut through to form a laminated siding piece having a flat piece of display material, possessing a freshly cut major surface, laminated to a beveled piece of support material.

13 Claims, 3 Drawing Sheets

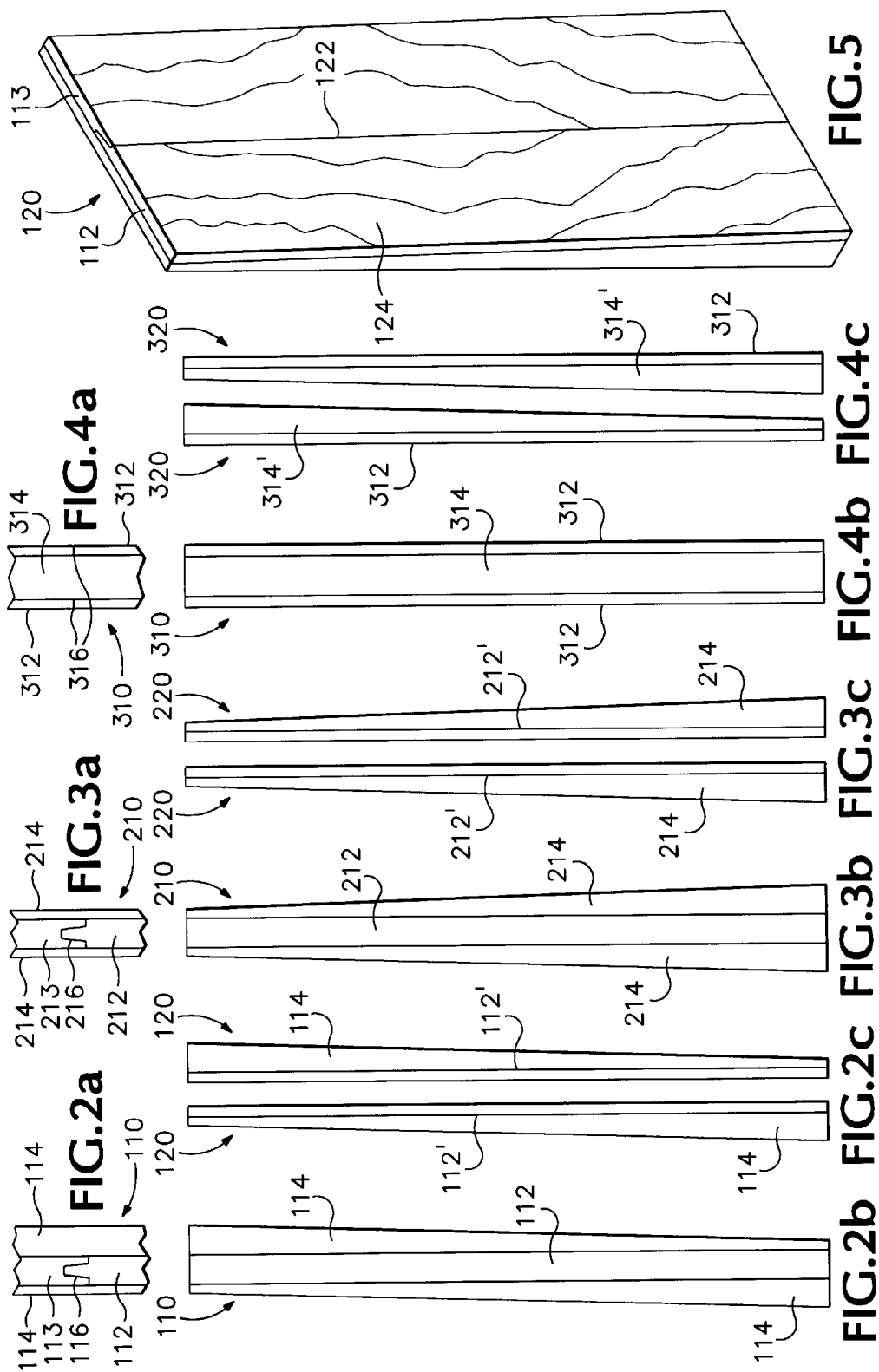

LAMINATED SIDING PIECES AND METHOD OF PRODUCING THE SAME

RELATED APPLICATIONS

This application is a CIP of PCT application PCT/US99/07556, filed Apr. 6, 1999, which claims priority from U.S. application Ser. No. 09/058,076 filed Apr. 8, 1998, now U.S. Pat. No. 6,042,680, issued on Mar. 28, 2000.

BACKGROUND OF THE INVENTION

In a world with a great abundance of easily harvested cedar trees, every house could have an exterior surface of natural cedar siding. Unfortunately, this is not the case. Cedar trees are increasingly rare, and the wood from these trees is increasingly expensive. In particular it is difficult to obtain, even at prices of $1,600 per 1,000 board feet or more, clear (i.e. without visible knots) cedar siding as unitary pieces (i.e. that have not been assembled from shorter pieces finger jointed together) in uniform 16 foot lengths. Obtaining siding pieces in shorter lengths greatly increases the work of the carpenters constructing a house, because more pieces must be nailed onto the frame to complete the construction. If the pieces are nonuniform in length, a certain amount of planning is added to the carpenters' work. The present invention has to do with a laminated wood product and method for producing the same, that permits a more efficient use of available cedar wood for providing siding material for houses.

Referring to FIGS. 1a–1d, long siding pieces that are formed by joining a first piece of cedar 10 and a second piece of cedar 12 together with finger-joints are too unsightly to be used to form the siding of a house unless they are covered with paint. Finger-joints are made by forming fingers 14 in both first piece 10 and second piece 12. Fingers 14 are separated in the thickness dimension, and extend from top to bottom in piece 10 and piece 12, which are fit together, by interleaving and adhering fingers 14, to form a finger-jointed board 16.

To produce siding pieces in the familiar beveled shape, piece 16 is cut diagonally from top to bottom, as shown in FIG. 1c to form two identically shaped siding pieces 20. Unfortunately, this diagonal cut causes the crooked finger joint pattern to be displayed as a crooked seam 22 on a beveled or sloping display surface 24 of each siding piece, as shown in FIG. 1d. This ruins the potential of the siding pieces as a display of natural cedar. Therefore, when finger-jointed cedar siding pieces are used, they are typically covered with a coat of paint. As used in this application the term beveled may refer to a surface such as surface 24 which is sloped relative to the other. surfaces of piece 20 or may be used to describe a piece having such a sloped or beveled surface.

U.S. Pat. No. 3,041,231, issued to Fountain, describes a method for making laminated boards from rotten wood in which the rotten wood is laminated between two higher grade wood pieces and cut in two to create two laminated pieces having rotten wood adhered to high grade wood. The rotten wood is then treated, for example by sand blasting, so that it may be used as a sort of a rustic display. The Fountain patent thus is not directed toward beveled siding pieces, nor is it aimed at producing more pieces of high grade clear cedar siding from a fixed amount of clear cedar wood than is possible with conventional techniques.

One persistent problem faced by wood pieces that are designed for exterior use, where they are exposed to the elements, is the threat of delamination. There has been a very famous case in which a wood product siding material has decomposed in actual use and resulted in hundreds of millions of dollars in liability claims against the manufacturer. As a result wood industry participants are now very wary of the problem of delamination in any laminated product produced for exterior use. Of particular concern with respect to siding pieces is the bottom edge of the siding piece. Water can remain suspended from the bottom edge for a considerable period of time, working its way between the lamina and eventually potentially causing delamination.

What is still desired, then, is a way to provide a greater amount of siding having a pleasing appearance and the weather-resisting qualities of clear cedar, from a limited amount of cedar wood, than has previously been possible.

SUMMARY

The present invention is a laminated siding piece comprising a beveled piece of support material and a substantially flat piece of display material laminated to said beveled piece of support material.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1b is a side view of the board of FIG. 1a.

FIG. 1c is a side view of two pieces of siding that have been produced by cutting the board of FIG. 1a.

FIG. 2a is a top view of a laminated siding workpiece according to a step in a preferred method of the present invention.

FIG. 2b is a side view of the laminated siding workpiece of FIG. 2a.

FIG. 2c is a side view of two pieces of siding that have been produced by cutting the siding workpiece of FIG. 2a.

FIG. 3a is a top view of a laminated siding workpiece according to a step in an alternative preferred method of the present invention.

FIG. 3b is a side view of the laminated siding workpiece of FIG. 3a.

FIG. 3c is a side view of two pieces of siding that have been produced by cutting the siding workpiece of FIG. 3a.

FIG. 4a is a top view of a laminated siding workpiece according to a step in a second alternative preferred method of the present invention.

FIG. 4b is a side view of the laminated siding workpiece of FIG. 4a.

FIG. 4c is a side view of two pieces of siding that have been produced by cutting the siding workpiece of FIG. 4a.

FIG. 5 is an isometric view of one of the identically shaped siding pieces shown in FIG. 2c.

DETAILED DESCRIPTION OF THE PREFERRED EMBODIMENTS

Figure 1A:
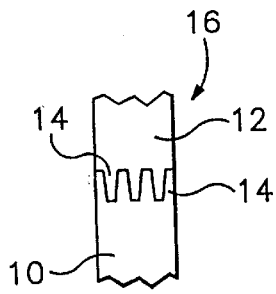
FIG. 1a is a top view of a prior art board that is made of two pieces that are finger jointed together.
Figure 1B:
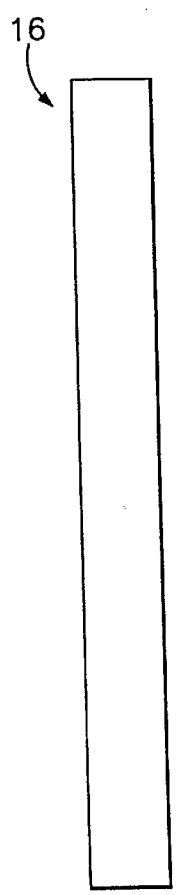
Figure 1C:
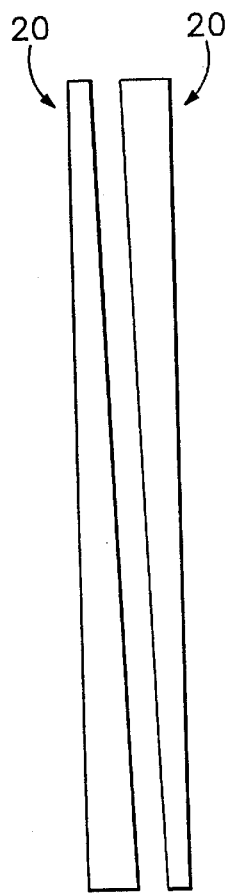
Figure 1D:
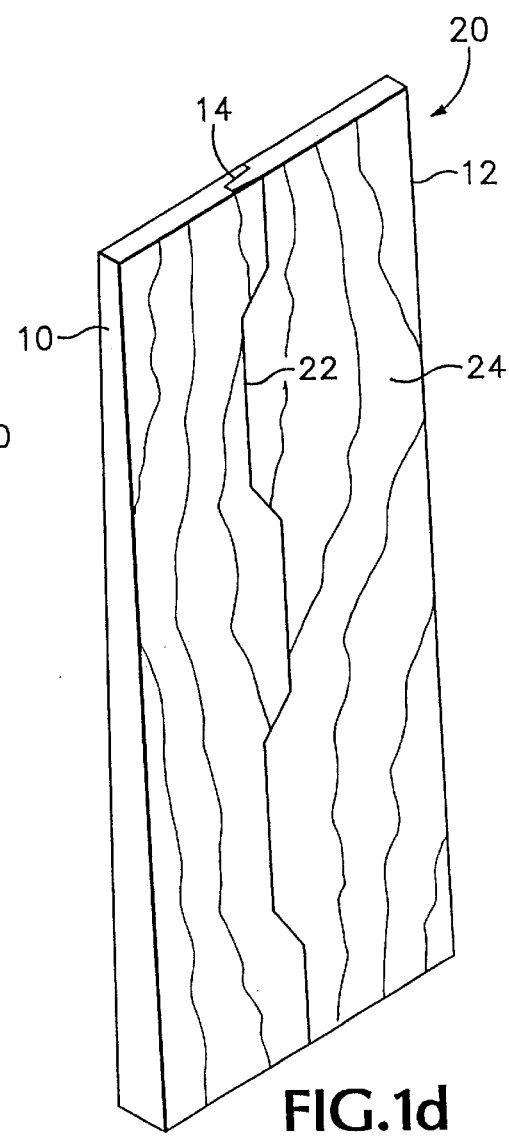
FIG. 1d is a perspective view of one of the siding pieces of FIG. 1c.

Referring to FIGS. 2a and 2b, a preferred method for producing siding pieces according to the present invention begins with the production of a laminated siding workpiece 110 in which a first display material piece 112 and a second display material piece 113, which are joined together by finger joint 116, are laminated between two beveled support pieces 114, preferably made of a material such as pine or fir wood. Display material pieces 112 and 113 are most typically clear cedar. Beveled support pieces 114 are offset in position and orientation from each other, as shown, so that laminated siding workpiece 110 is rectangular in cross-section. Alternatively, display support pieces 112 and 113 could be held together by being adhered to support piece 114 rather than with finger joint 116. In another alternative, a unitary piece of cedar could be used in place of joined display material pieces 112 and 113. Pieces 112 and 113 are flat, in the sense that word is used in this application, meaning that they are not beveled as are pieces 114, but are generally of uniform thickness.

Referring to FIG. 2c, laminated siding workpiece 110 is cut in two through display material pieces 112 and 113 to form two identically shaped siding pieces 120 having cut display material pieces 112' and 113'. Referring to FIG. 5, the seam 122, formed on the display face 124 of each siding piece 120 at the location of finger joint 116, is straight rather than crooked, as in prior art siding pieces 20. The fact that seam 122 is straight is an advantage to the present invention. Because seam 22 from the prior art was unsightly enough to preclude the use of prior art siding pieces 20 as display pieces, there was little effort among those producing siding pieces 20 to match up cedar pieces 10 and 12 so that there would be a reasonable continuity of coloration and grain across seam 22. In the present invention, however, if pieces 112 and 113 are well matched, seam 122 is unobtrusive enough to permit pieces 120 to be used as a natural display of cedar. As a result, it is possible, using the process of the present invention, to economically produce uniform sixteen-foot siding pieces that are suitable for display (to remain unpainted) on a house.

A first advantage of the preferred method described above is that display material pieces 112 and 113 are protected by support pieces 114 as laminated siding workpiece 110 is handled during the production process. Moreover, the sawing of pieces 112 and 113 imparts a desirable smoothness to resultant display face 124. A second advantage is that laminated siding workpiece 110 is rectangular in cross-section, which makes it more easily handled by the standard equipment found in many sawmills, which is typically adapted for handling boards that are rectangular in cross-section.

In FIGS. 3a–3c features which are alike to the features of FIGS. 2a–2c are referenced with numerals which are alike but which have been incremented by 100. Similar to FIGS. 2a–2c, FIGS. 3a–3c show a preferred method for producing siding pieces according to the present invention. This process begins with the production of a laminated siding workpiece 210, in which a first display material piece 212 and a second display material piece 213, which are interconnected with each other by a finger joint 216, are adhesively laminated between two beveled support pieces 214, preferably made of a material such as pine or fir wood. Laminated siding workpiece 210 is cut in two through display material pieces 212 and 213 to form two identically shaped siding pieces 220 having cut display material pieces 212' and 213'.

Display material pieces 212 and 213 are most typically clear cedar. Beveled support pieces 214 are offset from each other in position and orientation so that laminated siding workpiece 210 is trapezoidal. Referring specifically to FIG. 3a, display material piece 212 may be made of two or more constituent pieces that are joined by finger joints 216.

Laminated siding workpiece 110 or 210 may be made by laminating already beveled support pieces 114 or 214 to display material piece 112 and 113 or 212 and 213 or by laminating flat support material pieces to display material pieces 112 and 113 or 212 and 213 and then cutting the flat support material pieces diagonally to create beveled support pieces 114 or 214.

Referring to FIGS. 4a–4c, it is possible to form an intermediate laminate 310 by adhering a single flat support material piece 314 between two flat display material pieces 312 and then cutting support material piece 314 diagonally to create two beveled siding pieces 320. This method has the drawback that display material pieces 312 may be damaged both in the laminating process and in being handled before and during the cutting process. Therefore, the surface of the display material should be cut or shaved away after siding pieces 320 are otherwise formed to reveal a new, freshly cut surface. As shown in FIG. 4a, display material piece 312 may each comprise two constituent pieces held together by a finger joint 316.

Figure 6:
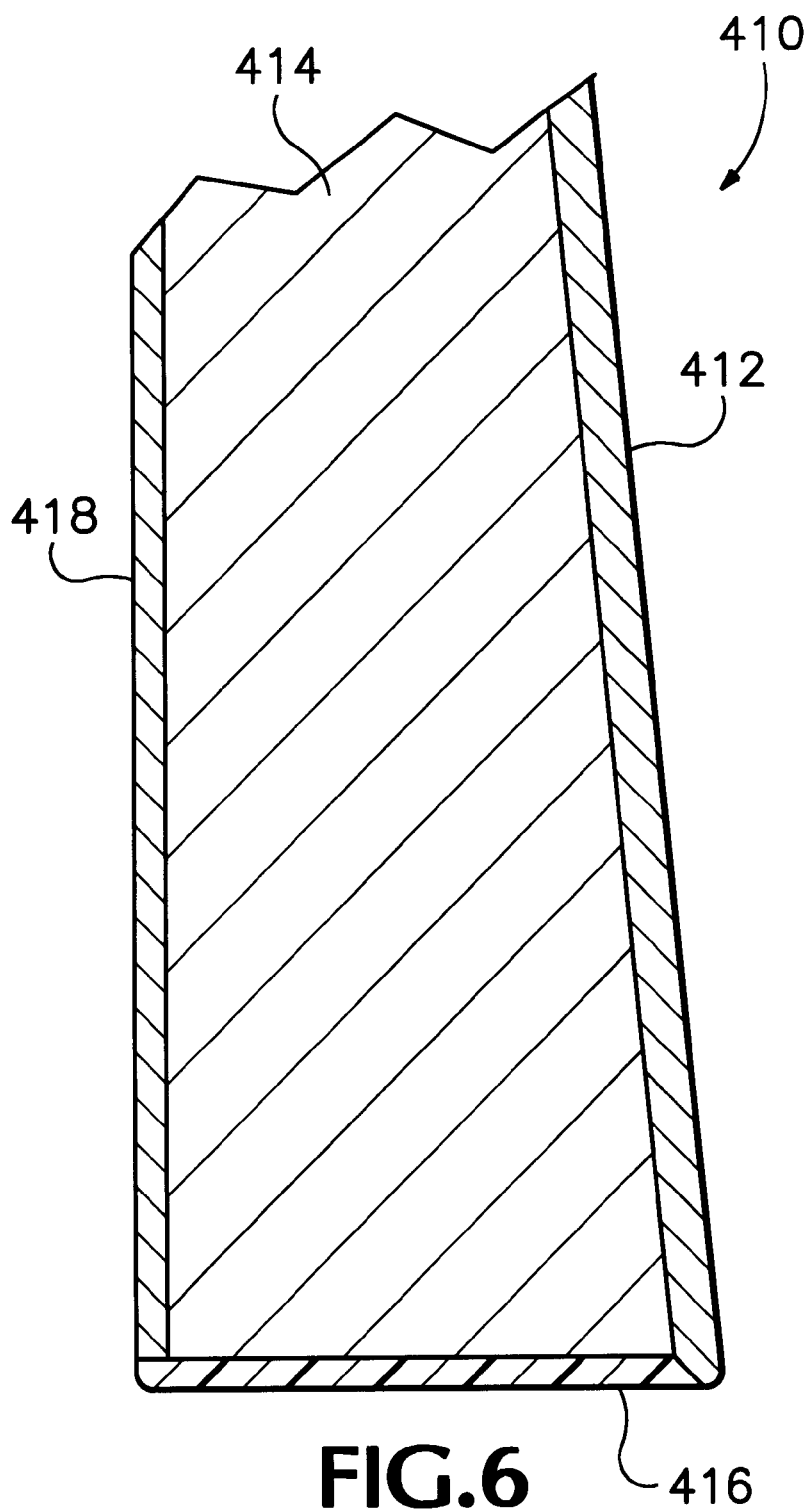
FIG. 6 is an isometric view of an alternative embodiment of a laminated siding piece, including a protective strip on the bottom edge.

An alternative embodiment, which is addressed to the problem of avoiding delamination, is shown in FIG. 6. A siding piece 410, having a piece of display material 412 and a piece of support material 414, also includes a polyurethane strip 416 that prevents water, which may remain suspended on the bottom edge of piece 410 for a considerable period of time, from penetrating into piece 410 and thereby causing delamination. In a preferred embodiment, the polyurethane strip 416 is of a material available under product name U-100-B Synthetic Patch/Pails and product code 100921110 from Willamette Valley Company of Eugene, Oreg. The seam between display wood 412 and polyurethane strip 416 extends downwardly at a 45° angle from the corner of the support material 414. This is a good angle for avoiding the collection of water at the seam and a resultant attack on the seam integrity.

Additionally, a paper or other printable material 418 is laminated to the side of piece 410 that is not displayed in use. Paper 418 affords the producer and or distributor with a surface to print the product name, user information and advertising information and images.

Beveled support pieces 114, 214, 314 and 414 are typically made of pine, fir, Douglas fir, larch or hemlock, but may also be of any inexpensive, structurally sound wood. Also, wood products and cellulose fiber products such as plywood, parallel strand lumber, particle board or wood chip board may be used for pieces 114, 214, 314 and 414, although care must be taken to avoid water exposure damage for this type of material. In addition, composite material could be used for pieces 114, 214, 314 and 414. One popular type of composite material is made of cellulose fiber and Portland cement and is sold under the name of Hardie Plank®. If both display pieces and support material pieces are made of wood, the process of lamination may be performed according to the well-known art of laminating wood pieces together with any commonly available wood glue. If the support material pieces are not made of wood the lamination process is also well known, through the use of an all-purpose glue, such as epoxy glue. Support pieces 114, 214, 314 and 414 are typically about ⅜ inch thick at their thickest and about ¹⁄₁₆ inch thick at their thinnest. Display material pieces 112, 113, 212 and 213 are typically about ¼ inch thick, so that cut display pieces 112', 113', 212', 213' and pieces 312 are typically slightly less than ⅛ inch thick because some material is lost to the saw blade. The sawing process is done according to standard well-known techniques with an effort made to minimize the loss of valuable cedar to the saw blade. This thinness permits considerably more siding pieces to produced from the same quantity of display material. Although cedar, due to its pleasant appearance and excellent ability to withstand weathering, is generally the most sought after siding material, display material pieces 112, 113, 212, 213 and 312 could be made of any material with similar properties, such as redwood.

The method of the present invention makes practical the production of siding pieces in a broad range of dimensions, ranging in width from 4 inches to 16 inches and in length from 2 feet to 16 feet or more. This also makes practical the use of producing the siding pieces in custom dimensions for a builder's particular job. For example, in the case of a 40 foot exterior wall a builder could order two 16 foot pieces and one 8 foot piece for each complete siding strip.

There may be a problem with delamination when using a display material with a different temperature coefficient of expansion or moisture content coefficient of expansion from the support piece material coefficient of expansion. For this reason it is generally advisable to pick materials with similar coefficients of expansion. For example, depending on the environment, it may be advisable to pick materials with coefficients of expansion that are within ±5%, ±10%, ±15% or ±20% of each other. Along these lines the use of high-grade wood of a particular species as the display material and low-grade wood of the same species as the support piece material offers one method of matching coefficients of expansion.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A laminated siding piece comprising:
   a) a beveled piece of support material, having a bottom surface and a beveled surface that is not perpendicular to said bottom surface; and
   b) a substantially flat piece of display wood, said display wood being more expensive than said support material, and said flat piece of display wood being laminated to said beveled surface, so that after said siding is installed onto a structure, said flat piece of display wood is openly displayed.

2. The laminated siding piece of claim 1 in which said flat piece of display wood is made of cedar wood.

3. The laminated siding piece of claim 1 in which said flat piece of display wood comprises redwood.

4. The laminated siding of claim 1 in which said substantially flat piece of display wood comprises at least two constituent pieces of display wood that have been joined together with finger joints.

5. The laminated siding of claim 1 in which said substantially flat piece of display wood and said beveled piece of support material are in some respect dissimilar and have been adhered together and wherein said display wood has a temperature coefficient of expansion that is within a range of approximately +10% about the temperature coefficient of expansion of said beveled piece of support material.

6. The laminated siding of claim 1 in which said substantially flat piece of display wood and said beveled piece of support material are in some respect dissimilar and have been adhered together and wherein said display wood has a moisture content coefficient of expansion that is within a range of approximately +10% about the moisture content coefficient of expansion of said beveled piece of support material.

7. The laminated siding of claim 1 in which said beveled piece of support material and said substantially flat piece of display wood are both made of the same species of wood, with a lower grade of said wood being used for said beveled piece of support material relative to the grade used for said flat piece of display wood.

8. The laminated siding piece of claim 1 further defining a thick, bottom edge and further including a protective strip and wherein said protective strip is attached to said thick bottom edge and wherein said protective strip is made of a material that is different from said support material and from said display wood.

9. The laminated siding piece of claim 8 wherein said protective strip is made of polyurethane.

10. The laminated siding piece of claim 8 wherein said protective strip is adhered to said thick bottom edge.

11. The laminated siding piece of claim 8 wherein said protective strip is adhered to said thick bottom edge.

12. The laminated siding piece of claim 1 wherein said support material defines a major surface that is not attached to said display wood and further including a piece of printable material attached to said major surface.

13. The laminated siding piece of claim 1 wherein said support material defines a major surface that is not attached to said display material and further including a piece of printable material attached to said major surface.

\* \* \* \* \*